United States Patent [19]

Eckman

[11] Patent Number: 5,022,798
[45] Date of Patent: Jun. 11, 1991

[54] THRUST-RESPONSIVE TWO-SPEED DRILL AND METHOD OF OPERATION

[75] Inventor: Richard E. Eckman, Houston, Tex.

[73] Assignee: Dresser Industries, Inc., Dallas, Tex.

[21] Appl. No.: 535,841

[22] Filed: Jun. 11, 1990

[51] Int. Cl.⁵ ............................................ B23B 35/00
[52] U.S. Cl. ................................... 408/1 R; 408/9; 408/12; 408/14; 408/702; 408/137
[58] Field of Search ..................... 408/1, 8, 14, 15, 7, 408/137, 133, 9, 132, 10, 11, 12, 13, 702

[56] References Cited

U.S. PATENT DOCUMENTS

| | | | |
|---|---|---|---|
| 2,547,079 | 4/1951 | Gerentes | 408/124 X |
| 4,198,180 | 4/1980 | Schultz | 408/10 X |
| 4,688,970 | 8/1987 | Eckman | 408/9 |
| 4,745,557 | 5/1988 | Pekar et al. | 408/10 X |

Primary Examiner—Larry I. Schwartz
Assistant Examiner—Robert Schultz

Attorney, Agent, or Firm—Richards, Medlock & Andrews

[57] ABSTRACT

A positive feed drill and method of operation is disclosed for drilling through a workpiece consisting of a softer overlay material on a harder base material. The positive feed drill includes a high-speed air motor and a low-speed air motor and will start and drill through the softer overlay material at the high speed but will shift to the low speed when the drill senses that the thrust on the drill bit has increased because the drill bit has contacted the harder base material. After drilling through the harder base material, the drill bit will shift to the high speed because the drill senses that the thrust on the drill bit has decreased. The drill will retract from the workpiece at high speed and will shut off. Control apparatus is provided to control the flow of air to the high-speed and low-speed air motors. Sensing apparatus senses the thrust on the drill bit and sends a signal to the control apparatus to switch between the air motors. Apparatus is included to sense the end-of-feed position, retract the spindle and shut the drill off.

12 Claims, 9 Drawing Sheets

THRUST-RESPONSIVE TWO-SPEED DRILL AND METHOD OF OPERATION

FIELD OF THE INVENTION

This invention relates generally to positive feed drills. More particularly, but not way of limitation, this invention relates to a positive feed drill including control apparatus for automatically changing drill speed from high speed to low speed during the drilling process and then automatically changing the drill speed back to high speed, retracting the spindle and shutting the drill off after the hole has been drilled.

BACKGROUND OF THE INVENTION

Positive feed power drills have a motor for turning a spindle through a drive gear train. For advancing the spindle as a bit drills through a workpiece, the spindle is threaded into a feed gear which turns at a predetermined rate faster than the turning rate of the drill bit. The feed gear is driven by a gear train usually from the same motor as the drive gear train. The gear ratio of the drive gear train is selected to be slightly greater than the gear ratio of the feed gear train so the feed gear will turn a fraction of an rpm faster than the drive gear. In that way, the drill bit and spindle are advanced a predetermined amount for each turn of the drill bit and spindle. Once the spindle and drill bit have been advanced a sufficient distance, a mechanism is usually actuated to disengage the feed gear train from the motor and lock it in place so that, as the motor continues to turn the spindle drive gear in the same direction, the spindle turns inside the locked feed gear to rapidly retract the spindle and drill bit from the workpiece.

Many companies which manufacture aircraft are presently utilizing overlay materials of different types and hardness. For weight reduction (with minimum loss of strength) and stealth characteristics, graphite and kevlar composites are laid over titanium, stainless steel, etc. It has been found desirable to drill through the composite overlay material at high rpm (revolutions per minute) and to drill through the harder base metal at a lower rpm.

There has been provided in prior art, a two-speed positive-feed drill which can be programmed to change speeds back and forth in response to the depth the tool has drilled. This tool requires that an air signal be sent to a cylinder to shift clutches in the gear train to bring planetary gear reductions in and out of the system as the drill bit reaches predetermined depths in the workpiece.

Because of the complex curvatures of portions of modern aircraft, the thickness of the material is in constant variance. Because of the constant variance of material thickness, the usefulness of a tool that would change speed as a result of drill depth would be greatly limited. To enhance the usefulness of the prior art tool, the programmable depth sensing features have been replaced with electronic load cells and valving that supplies air to the speed changing cylinder as a result of the thrust generated by the drill bit. Unfortunately, the prior art tool is now very large, expensive and is really not suited for production drilling.

SUMMARY OF THE INVENTION

The present invention provides a positive feed drill for drilling through soft composites of a workpiece which are laid over harder metals of the workpiece. The positive feed drill will drill through the softer materials at a high speed and will then shift to a lower speed when the drill bit contacts the harder material. The positive feed drill will drill through the harder material at the lower speed, shift to the higher speed, retract from the workpiece and shut down the drill upon completion of the drilling. The positive feed drill will start and run at the higher speed until the amount of thrust on the drill bit reaches a predetermined value and then the drill will switch to the lower speed until the thrust drops below a predetermined value and then the drill will switch back to the higher speed.

In a preferred embodiment, the positive feed drill includes a housing, a high-speed air motor in the housing having an output shaft connected through a first drive train to a drill spindle reciprocally movable in feed and retract motions and a low-speed air motor in the housing having an output shaft connected through an air clutch and a second drive train to the drill spindle. A differential drive gear is common to both the first and second drive trains and is driven thereby. A differential feed gear is movable between a spindle feed position wherein the differential feed gear is rotatable with the differential drive gear and a spindle retract position wherein the differential feed gear ceases rotation and the differential drive gear continues to rotate the spindle causing the spindle to retract. Retract control means is provided for moving the differential feed gear between the two positions. Control means is provided to control the flow of air to the two air motors. Means for sensing the thrust on the drill spindle and drill bit is provided for sending a signal to the control means to switch between the two air motors. Means to sense the retraction of the spindle is provided and signals a master valve to shut down the positive feed drill when the spindle retracts after the hole has been drilled.

BRIEF DESCRIPTION OF THE DRAWINGS

Other advantages and features of the invention will become more apparent with reference to the following detailed description of a presently preferred embodiment thereof in connection with the accompanying drawings wherein like reference numerals have been applied to like elements, in which.

Figure 1:
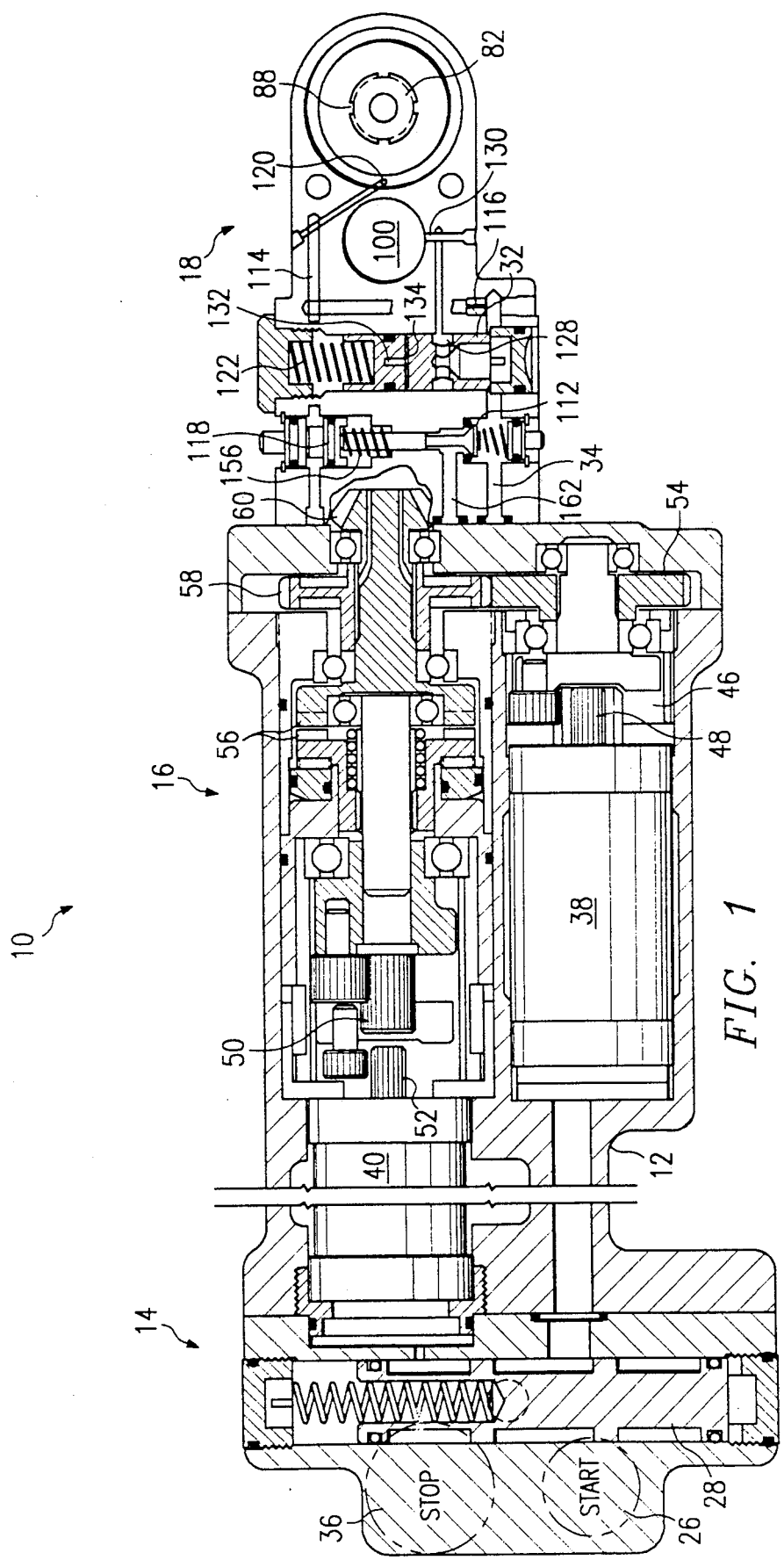
FIG. 1 is a top longitudinal section view of a pneumatic power drill constructed in accordance with the present invention.

Pressurized lines are shown in the drawings as solid black while exhausted and partially pressurized lines are shown as dashed.

DETAILED DESCRIPTION

Figure 2:
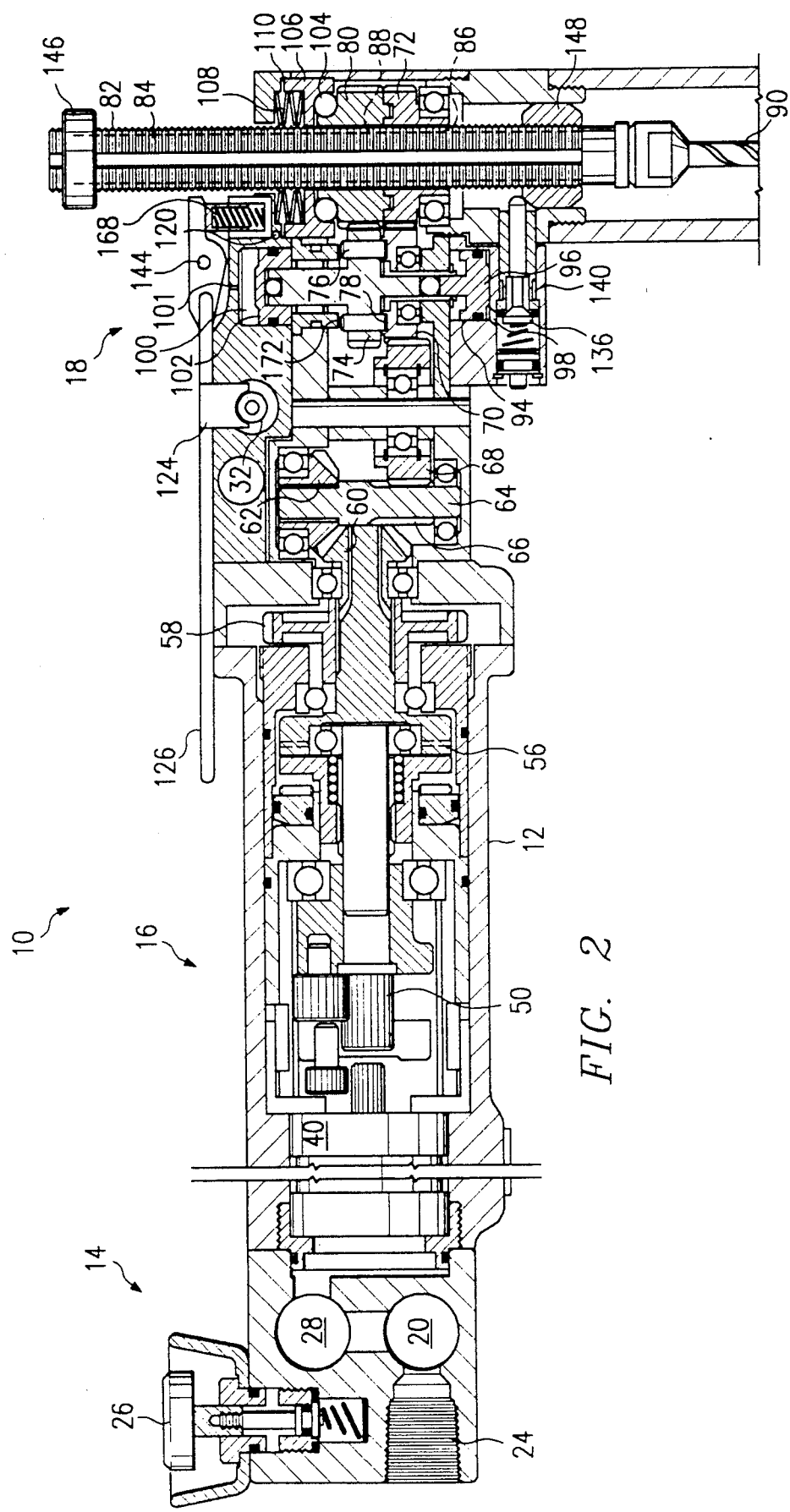
FIG. 2 is a side longitudinal section view of the pneumatic power drill of FIG. 1.
Figure 3:
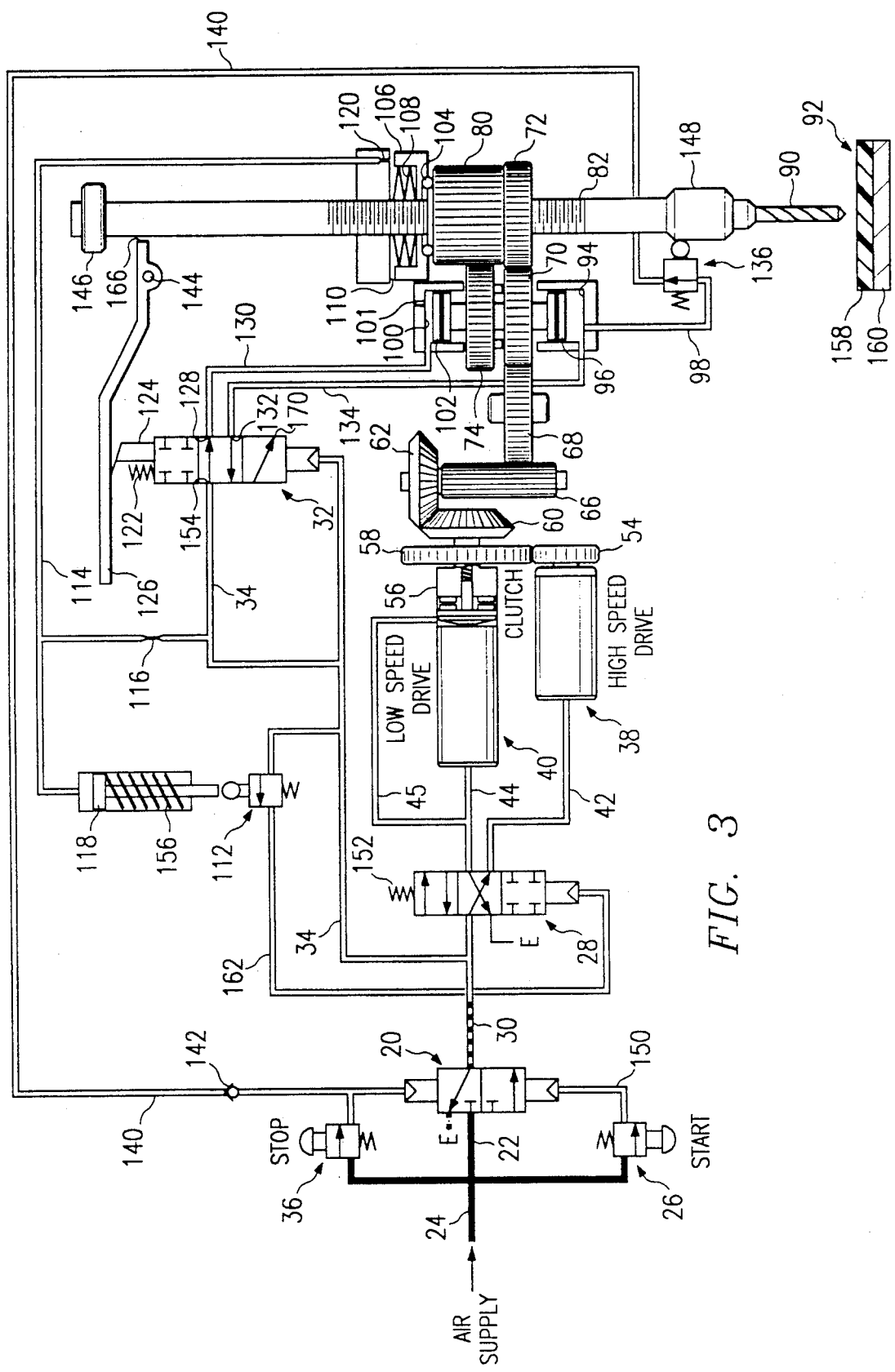
FIG. 3 is a pneumatic circuit schematic showing the state of the elements of the inventive pneumatic power drill in the "standby" state.

Referring to the drawings and to FIGS. 1-3 in particular, shown therein and generally designated by the reference character 10 is a positive feed drill that is constructed in accordance with the invention. The drill 10 includes a housing 12 generally comprising an inlet end portion 14, a motor and gear portion 16 and a drill head portion 18.

Inlet end portion 14 includes a master valve 20 connected by line 22 to an inlet 24 that is arranged to be connected with a source of pressurized air (not shown). In the preferred embodiment, master valve 20 comprises a three-way valve. Inlet end portion 14 also includes a start valve 26 connected between inlet 24 and the master valve 20. Master valve 20 is connected to selector valve 28 by line 30 and to retract valve 32 by lines 30 and 34. In the preferred embodiment, selector valve 28 and retract valve 32 are four-way valves. Stop valve 36 is also connected between the inlet 24 and master valve 20.

Contained within the motor and gear portion 16 is a first or high-speed air motor 38 and a second or low-speed air motor 40 with the high-speed air motor 38 connected to the selector valve 28 by line 42 and the low-speed air motor 40 connected to the selector valve 28 by line 44. It will be appreciated that the first or high-speed air motor 38 runs at a higher speed than the second or low-speed air motor 40. A first reduction planetary gear train 46 is connected to high-speed air motor 38 by motor output shaft 48 while a second reduction planetary gear train 50 is connected to low-speed air motor 40 by motor output shaft 52. In the preferred embodiment, first reduction planetary gear train 46 and second reduction planetary gear train 50 can be various combinations of single, double, triple, etc. reductions to achieve almost any required speed combination between the high-speed value and the low-speed value associated with the outputs of gear trains 46 and 50. The output of the first reduction planetary gear train 46 is connected to and drives spur gear 54. The output of second reduction planetary gear train 50 is connected to air-operated jaw clutch 56 whose output is connected to and drives spur gear 58 and bevel gear 60. Spur gear 54 also drives spur gear 58. FIG. 1 shows the air-operated jaw clutch 56 disengaged while FIG. 2 shows the air-operated jaw clutch 56 engaged.

Contained within the drill head portion 18 is bevel gear 62 which is driven by bevel gear 60. Bevel gear 62 is pinned or keyed to one end of shaft 64 with pinion 66 being cut or machined on the opposite end of shaft 64. Pinion 66 is in mesh with idler gear 68 which in turn is in mesh with differential drive gear 70. Differential drive gear 70 is in mesh with spindle drive gear 72. A differential feed gear 74 is located on a common shaft with the differential drive gear 70 and is releasably connected for movement with the differential drive gear 70 by a plurality of pins 76 when pins 76 are positioned in recesses 78 in differential drive gear 70. Differential feed gear 74 is in mesh with spindle speed gear 80.

Spindle drive gear 72 and spindle feed gear 80 are carried by a drill spindle 82 that has a threaded exterior 84.

The spindle drive gear 72 operates on and is slidably keyed to the spindle 82 through tangs or keys 86 formed in the spindle drive gear 72 which operate in conjunction with longitudinal grooves or key slots 88 formed in spindle 82 so that the spindle drive gear 72 always rotates at the same speed and with the spindle 82. The spindle 82 is driven by the spindle drive gear 72 and can move longitudinally within the spindle drive gear 72. Spindle feed gear 80, which is driven by differential feed gear 74, is threaded onto the spindle over the left-hand threads of threaded exterior 84. The gear ratio of the spindle feed gear 80, and the differential feed gear 74 is slightly higher than the gear ratio of the spindle drive gear 72 and the differential drive gear 70 so that the spindle feed gear 80 turns faster than the spindle 82 and spindle drive gear 72 and will feed the spindle 82 and drill bit or cutter 90 toward the composite workpiece 92 at a rate proportional to the difference in the speed of rotation of the spindle drive gear 72 and the spindle feed gear 80.

Drill head portion 18 also includes a retract cylinder bore 94 having a retract piston 96 mounted therein. It will be appreciated that air pressure applied into the retract cylinder bore 94 through line 134 will cause the retract piston 96 to move upwardly and move the differential feed gear 74 upwardly such that the differential feed gear 74 is no longer in a locked relationship with the differential drive gear 70 by pins 76 and is then in the retract position. In the retract position, the differential feed gear 74 and the spindle feed gear 80 stop rotating and the drill spindle 82 is caused to retract.

Position generally opposite from the retract cylinder bore 94 is the feed cylinder bore 100 having a feed piston 102 mounted therein. It will be appreciated that air pressure applied into the feed cylinder bore 100 through line 130 will cause the feed piston 102 to move downwardly and positively force the differential feed gear 74 into locked relationship with the differential drive gear 70 causing the drill spindle 82 to feed. Vent hole 101 (see FIG. 2) is formed through the wall of feed cylinder bore 100 to vent the feed cylinder bore 100 when the retract cylinder bore 94 is pressurized. Vent hole 101 will emit air when the feed cylinder bore 100 is pressurized but vent hole 101 is not large enough to significantly affect the pressure on feed piston 102.

The longitudinal thrust or forces incurred by drill bit or cutter 90 are transferred through the spindle feed gear 80 to means for sensing the thrust on the drill spindle 82 and drill bit or cutter 90. The means for sensing comprises at least bearing 104, thrust cup 106, belleville springs 108 and spindle feed gear 80 with bearing 104 being positioned between thrust cup 106 and spindle feed gear 80. Thrust cup 106 is slidably mounted within housing 12 and is forced toward the spindle feed gear 80 by belleville springs 108. Bearing 104, thrust cup 106 and belleville springs 108 are coaxial with respect to spindle 82. The housing 12 and thrust cup 106 are structured such that a gap 110 of predetermined dimension exists between housing 12 and thrust cup 106 as long as the thrust against the drill spindle 82 and drill bit or cutter 90 is below a predetermined value. In other words, the drilling thrust is being opposed by the belleville springs 108.

The control means for controlling the various phases of operation of the positive feed drill 10 comprises at least line 34 which is connected between line 30 and first switch valve 112, retract valve 32 and bleed line 114 through orifice 116. Bleed line 114 connects switch piston 118 and bleed port 120 which opens into gap 110. Retract valve 32 is urged into the position shown in FIG. 3 by spring 122 and maintained in that position by tang 124 of retract lever 126 even when line 34 is pressurized through master valve 20. While in the position shown in FIG. 3, port 128 in retract valve 32 is connected to feed cylinder bore 100 by line 130 and port 132 is connected to retract cylinder bore 94 by line 134. Second switch valve 136 is connected to the retract cylinder bore 94 by line 98 and to master valve 20 and stop valve 36 by line 140 which contains check valve 142. Retract lever 126 is pivoted clockwise (see FIG. 3) around pin 144 by feed limit ring 146 when drill spindle 82 is fed downwardly a predetermined distance and thereby removes tang 124 from retract valve 32. Retract stop ring 148 is attached to drill spindle 82 and when drill spindle 82 is in the retract or up position, retract stop ring 148 opens second switch valve 136 which connects line 98 and line 140.

The overall operation of the inventive drill will be discussed with reference to FIGS. 3-9. With reference to FIG. 3, the inlet 24 of positive feed drill 10 is connected to a source of pressurized air (not shown). The positive feed drill 10 is in the standby mode or the exhausted state when the master valve 20 is positioned such that the pressurized air from inlet 24 cannot pass to line 30.

Figure 4:
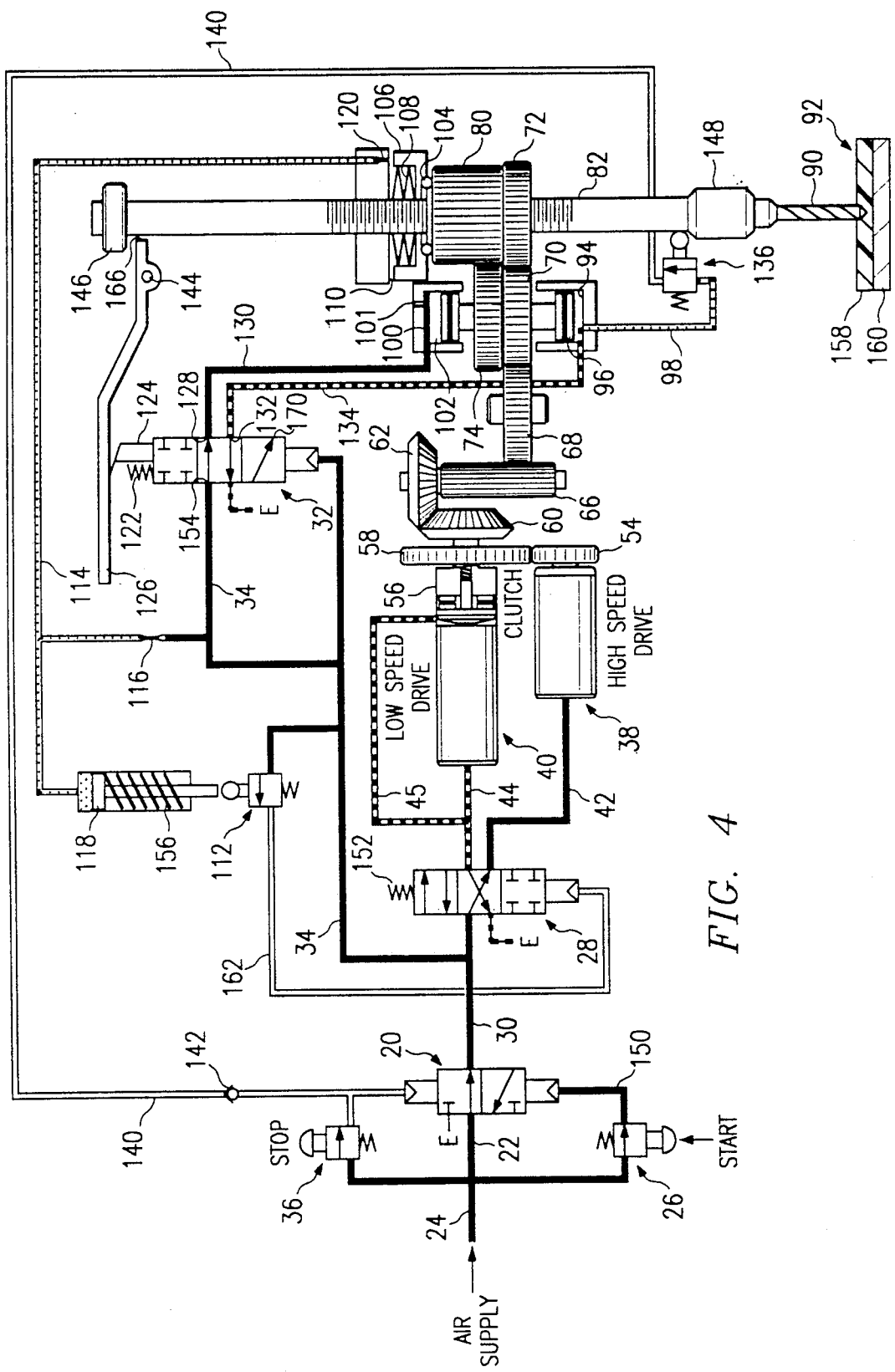
FIG. 4 is a pneumatic circuit schematic showing the state of the elements of the inventive pneumatic power drill after the start button is depressed.

With reference to FIG. 4, the operator starts the drilling process by depressing the start button on start valve 26 which allows pressurized air to pass through start valve 26 and line 150 to actuate or stroke master valve 20 allowing pressurized air to pass through master valve 20, selector valve 28 and line 42 to drive high-speed air motor 38. Selector valve 28 is biased by spring 152 so the high-speed air motor 38 will be the first motor to receive air on start-up and the drill will always start in the high-speed drilling mode. The low-speed air motor 40 is exhausted through line 44 and selector valve 28 while clutch 56 is exhausted (disengaged) through lines 45 and 44 and selector valve 28. High-speed air motor 38 provides the force to rotate spindle 82 and drill bit or cutter 90 through a first drive train including spur gears 54 and 58, bevel gears 60 and 62, idler gear 68, differential drive gear 70 and spindle drive gear 72. At the same time, pressurized air also flows from line 30, through line 34 to port 154 in retract valve 32 and then out port 128 and line 130 to feed cylinder bore 100.

High-speed air motor 38 also provides, through a second drive train, the force to feed or move downwardly the spindle 82 and drill bit or cutter 90 while they are rotating. The second drive train includes spur gears 54 and 58, bevel gears 60 and 62, idler gears 68, differential drive gear 70, differential feed gear 74 and the spindle feed gear 80. The pressurized air in feed cylinder bore 100 drives the feed piston 102 downwardly moving the differential feed gear 74 and the pins 76 into the differential drive gear 70 so that the differential feed gear 74 and the differential drive gear 70 rotate together and the differential feed gear 74 drives the spindle feed gear 80 causing the spindle 82 and drill bit or cutter 90 to move downwardly while rotating. The retract cylinder bore 94 is exhausted through line 134 and port 132 of retract valve 32.

It will be appreciated that retract valve 32 is urged into the position shown in FIG. 3 by spring 122. Pressurized air in line 34 acts on the end of retract valve 32 and would move retract valve 32 against spring 122, but retract valve 32 is restrained by tang 124 on retract lever 126.

Pressurized air from line 34 also flows into bleed line 114 through orifice 116 to partially pressurize bleed line 114. As previously stated, bleed line 114 connects switch piston 118 and bleed port 120 with bleed port 120 being a small, restrictive hole bleeding air into gap 110 between thrust cup 106 and housing 12. Switch piston 118 is urged away from first switch valve 112 by spring 156. Because of the size and ability of bleed port 120 to pass air and the restrictive nature and size of orifice 116, the air pressure in bleed line 114 is not sufficient to compress spring 156 and stroke switch piston 118 when the positive-feed drill 10 is operating in the high-speed mode with the high-speed air motor 38 being driven by the pressurized air and the thrust against the drill spindle 82 and drill bit or cutter 90 is below a predetermined value.

With the positive feed drill 10 running in the high-speed mode and with the feed engaged, the drill bit or cutter 90 will be fed into the composite workpiece 92 comprising a softer overlay material 158 and a harder base material 160. The thrust of the drill bit or cutter 90 is transmitted through the spindle feed gear 80 to belleville springs 108 which maintains gap 110 while drill bit or cutter 90 is drilling or cutting through the softer overlay material 158. The force of the belleville springs 108 will be sufficient to overcome the thrust of the drill bit 90 as it cuts through the softer overlay material 158 and maintains gap 110 so that bleed port 120 may pass or expel air from bleed line 114.

Figure 5:
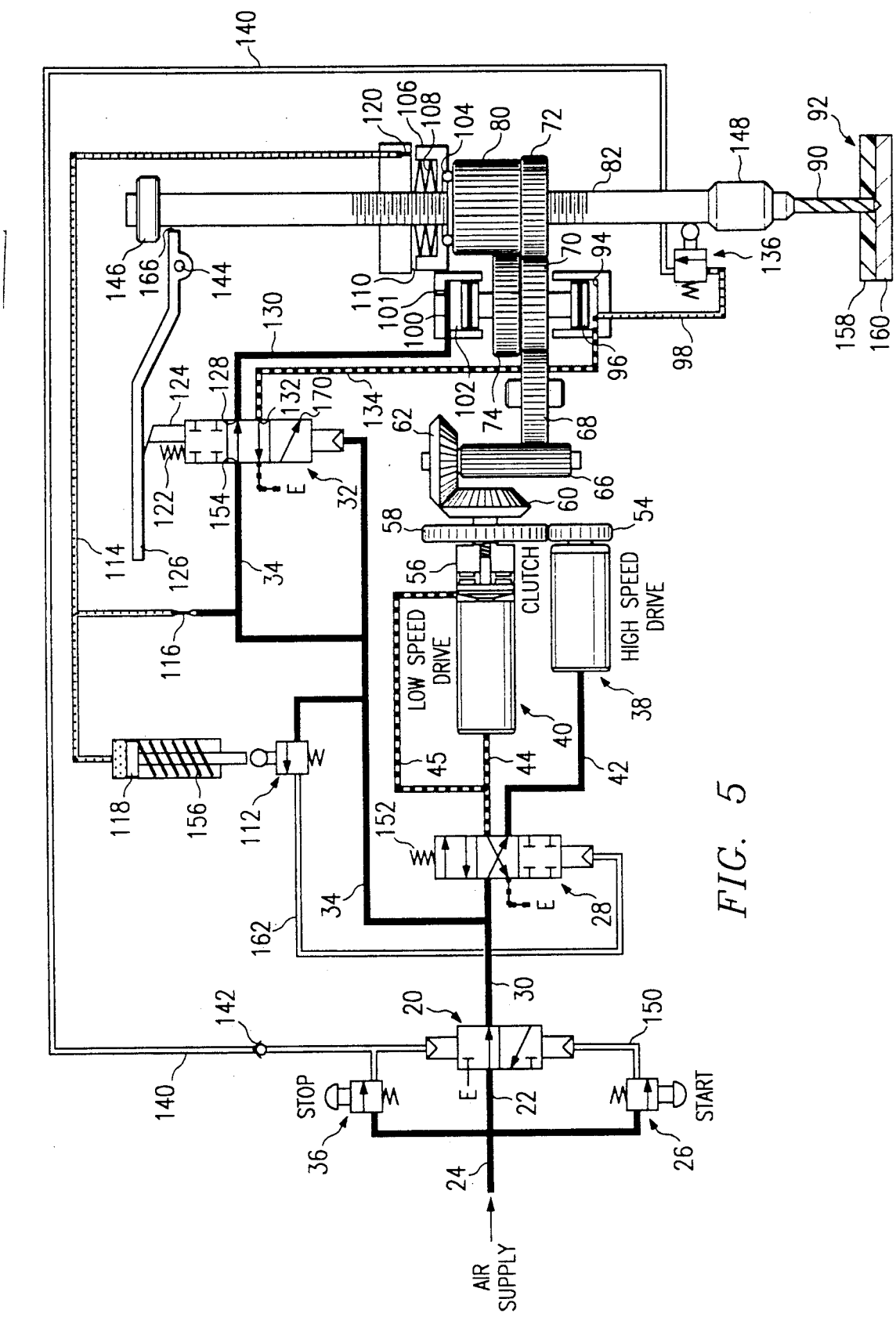
FIG. 5 is a pneumatic circuit schematic showing the state of the elements of the inventive pneumatic power drill after the drill bit has contacted the harder material.
Figure 6:
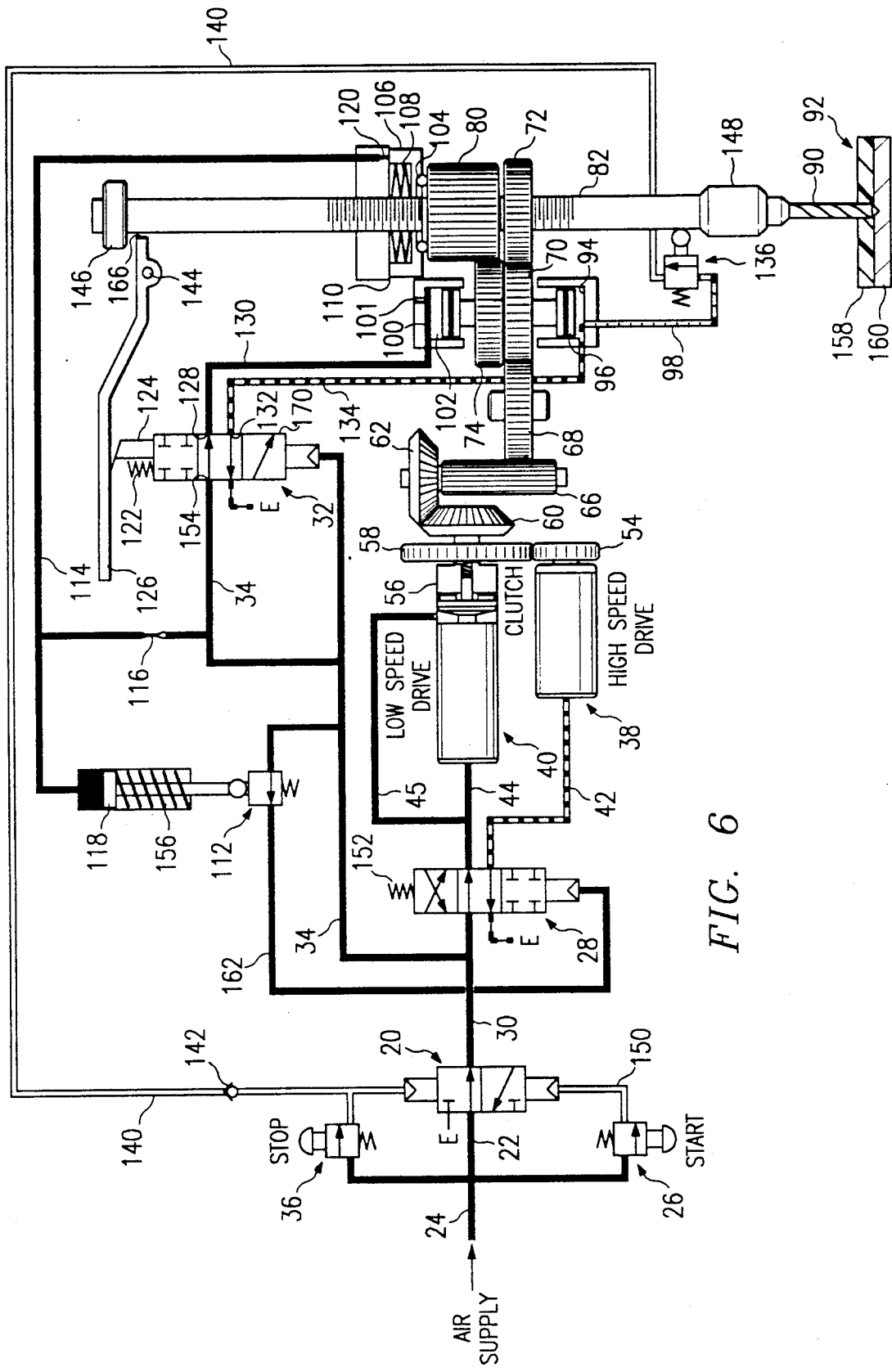
FIG. 6 is a pneumatic circuit schematic showing the state of the elements of the inventive pneumatic power drill after the drill bit has been drilling into the harder material.

With reference to FIGS. 5 and 6, when the drill bit or cutter 90 cuts through the softer overlay material 158 and contacts the harder base material 160, at a fast drilling speed and drill advancement, the thrust of the drill bit 90 will rapidly increase, compress the belleville springs 108 and seal off bleed port 120 so it can no longer pass air from bleed line 114. Air pressure in bleed line 114 will approach that in line 34 and the air pressure will be sufficient to overcome spring 156 and stroke switch piston 118 which will open first switch valve 112 and admit pressurized air into line 162 which is connected between first switch valve 112 and the end of selector valve 28 which is opposite spring 152. Pressurized air in line 162 shifts selector valve 28 and will exhaust line 42 and high-speed air motor 38. Pressurized air now passes from line 30 through selector valve 28 and through line 44 to drive low-speed air motor 40 and from line 44 through line 45 to engage clutch 56. Low-speed air motor 40 now provides the force to rotate spindle 82 and drill bit or cutter 90 at the lower speed through spur gear 58, bevel gears 60 and 62, idler gear 68, differential drive gear 70 and spindle drive gear 72. This low-speed drilling in the harder base material will be maintained as long as the bleed port 120 remains blocked because of the higher thrust associated with drill bit or cutter 90.

It will be appreciated that when the low-speed air motor 40 is running, the high-speed air motor 38 is being rotated slowly through spur gears 58 and 54 but this does not provide a problem since the inlet to the high-speed air motor 38 is open to exhaust through line 42 and selector valve 28.

Figure 7:
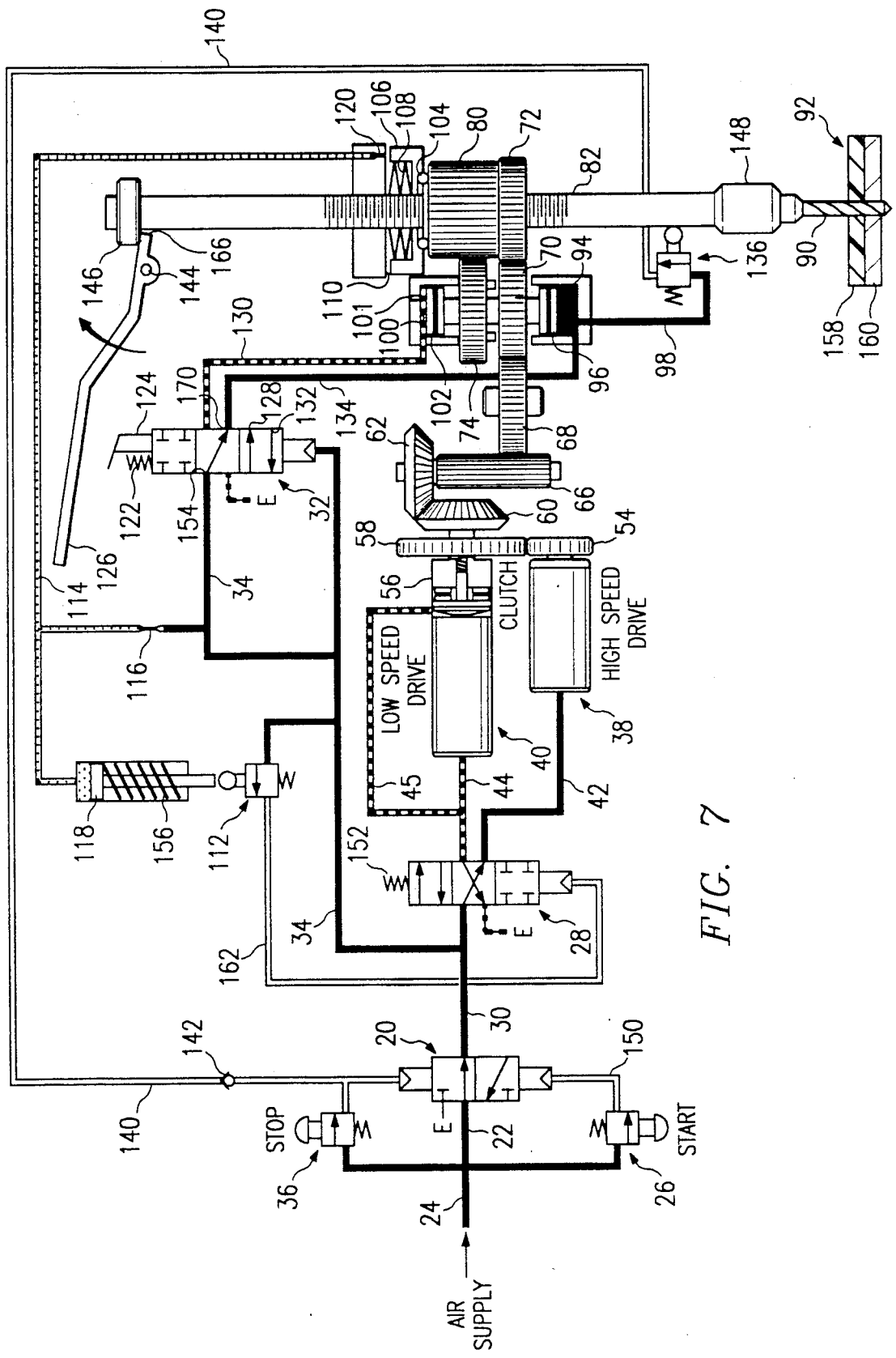
FIG. 7 is a pneumatic circuit schematic showing the state of the elements of the inventive pneumatic power drill after the drill bit has drilled through the harder material.
Figure 8:
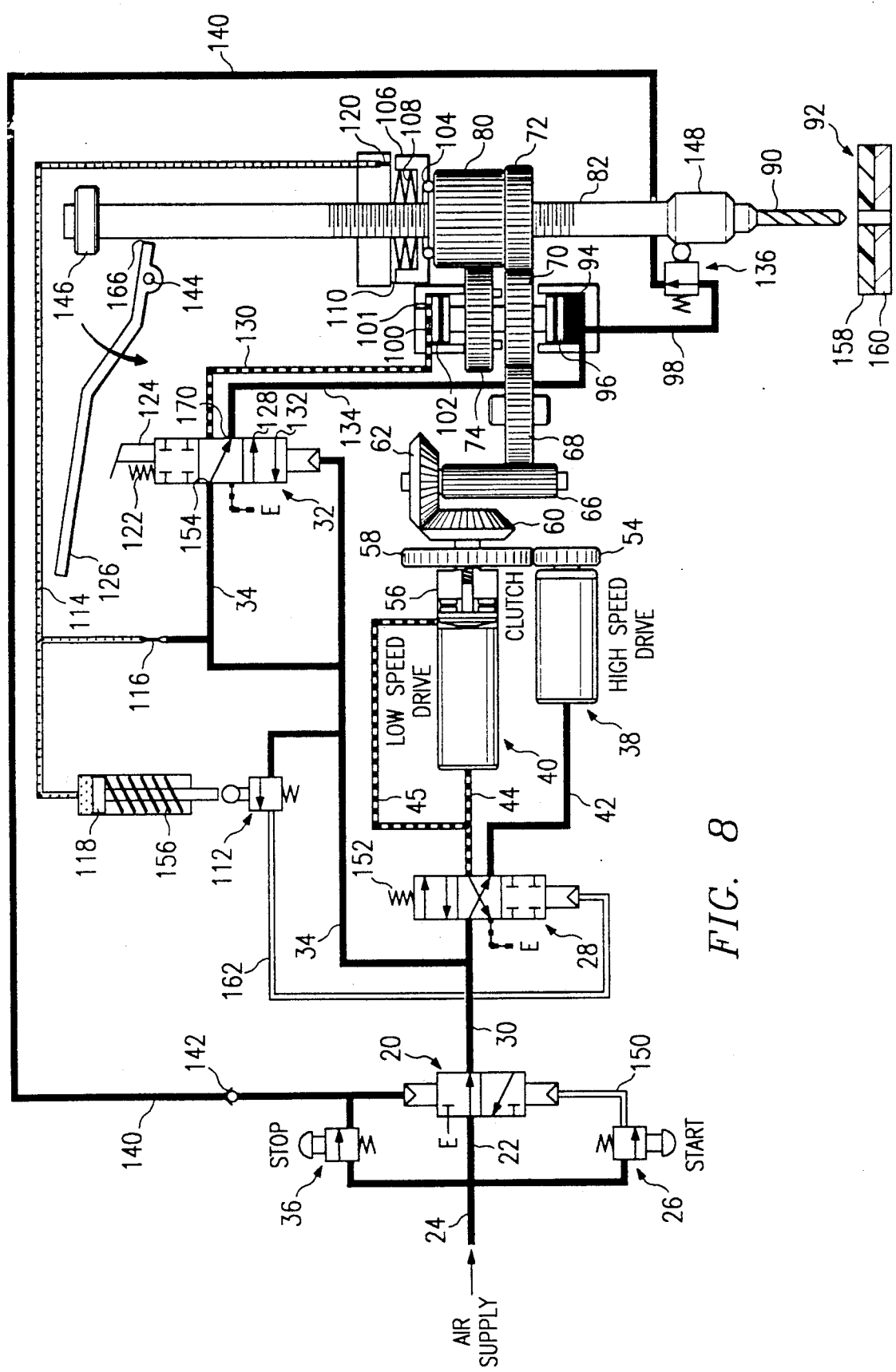
FIG. 8 is a pneumatic circuit schematic showing the state of the elements of the inventive pneumatic power drill as the drill bit is being retracted from the composite workpiece.

With reference to FIGS. 7 and 8, the positive feed drill 10 will drill at the lower speed while drilling in the harder base material 160. When the drill bit or cutter 90 breaks through the harder base material 160, the thrust will rapidly decrease, the belleville springs 108 will force the thrust cup 106 downwardly toward the drill bit 90 which opens or unblocks the feed port 120 which causes the pressure in bleed line 114 to drop and become only partially pressurized. The lower pressure in bleed line 114 causes spring 156 to move switch piston 118 and close first switch valve 112 which will remove the pressurized air supplied from line 30 to line 162 and allow spring 152 to move the selector valve 28 back to the position where lines 44 and 45 are exhausted and pressurized air is supplied to line 42. With lines 44 and 45 exhausted and pressurized air provided to line 42, low-speed air motor 40 is stopped and high-speed motor 38 is running and driving spindle 82 and drill bit 90.

While turning at the high speed, spindle 82 and drill bit 90 will continue to be fed into the composite workpiece 92 until feed limit ring 146, positioned on the upper end of spindle 82, contacts tip 166 of retract lever 126. Retract lever 126 will pivot about pin 144 as spindle 82 advances, and compress retract lever spring 168 (see FIG. 2) while withdrawing tang 124 from retract valve 32. The withdrawal of tang 124 allows the pressurized air in line 34 to stroke retract valve 32 and compress spring 122. Port 170 of retract valve 32 is now in alignment with line 134 and allows the pressurized air in line 34 to flow through the retract valve 32 and line 134 to retract cylinder bore 94 and to second switch valve 136 through line 98. The pressurized air in line 130 is exhausted to the atmosphere through vent hole 101 so there is no longer pressurized air in feed cylinder bore 100 to force and hold feed piston 102 in the downward feed or drive position. The pressurized air in the retract cylinder bore 94 will force retract piston 96 upwardly (as shown in FIG. 7) and raise the differential feed gear 74 out of engagement with the differential drive gear 70 until pins 76 engage recesses 172 (see FIG. 2) in housing 12. When this occurs, rotation of the differential feed gear 74 and the spindle feed gear 80 ceases, while the differential drive gear 70 continues to rotate and to rotate the spindle 82 and drill bit 90. With the spindle feed gear 80 locked, the rotating spindle 82 starts an upwardly or retract motion.

The retract motion continues upwardly away from the composite workpiece 92 until retract stop ring 148 contacts and opens second switch valve 136 which allows pressurized air from line 98 to enter line 140 and flow past check valve 142 to master valve 20 and close master valve 20. Closing master valve 20 exhausts line 30 through the master valve 20 and results in the dumping or exhausting the pressurized air from the positive feed drill 10. The retract valve 32 and retract lever 126 are reset because of the actions of spring 122 and 168, respectively. Of course, selector valve 28 was reset as soon as the retract motion started. Second switch valve 136 will remain depressed, but the positive feed drill 10 may be started since the second switch valve 136 is not activated until retract valve 32 strokes and allows pressurized air to enter line 134 and line 98.

Figure 9:
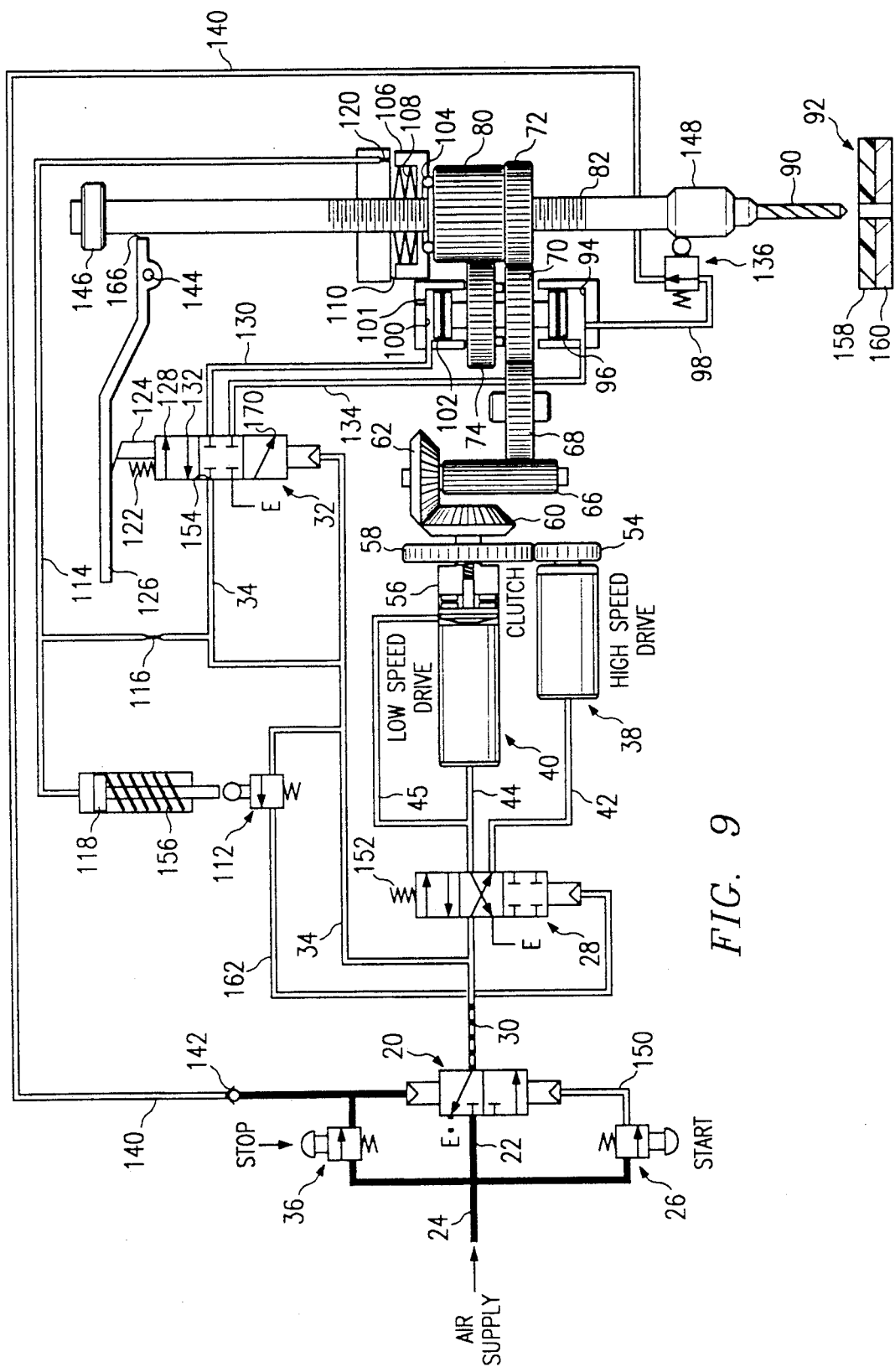
FIG. 9 is a pneumatic circuit schematic showing the state of the elements of the inventive pneumatic power drill after the stop button is depressed.

During any phase of the drilling procedure, the positive feed drill 10 and the drilling may be stopped by depressing the stop button on stop valve 36. As shown in FIG. 9, when the stop button is depressed, pressurized air from inlet 24 is allowed to flow through stop valve 36 into line 140 (up to check valve 142) closing master valve 20 and exhausting line 30 through master valve 20 which results in exhausting and shutting down the positive feed drill 10. Selector valve 28 and retract valve 32 will reset because of the actions of springs 152 and 122, respectively. Retract lever 32 will reset because of spring 168 unless tip 166 is in contact with feed limit ring 146.

Although the present invention has been described with reference to a presently preferred embodiment, it will be appreciated by those skilled in the art that various modifications, alternatives, variations, etc., may be made without departing from the spirit and scope of the invention as defined in the appended claims.

I claim:

1. A pneumatically powered positive feed drill for drilling a hole in a workpiece consisting of a layer of material of a first hardness overlaying a material of a second hardness greater than the first hardness, the hole in the material of the first hardness to be drilled at a first speed and the hole in the material of the second hardness to be drilled at a second and slower speed, said positive feed drill comprising:

a housing;

a rotatable drill spindle mounted in said housing for feed and retract motion and including means for mounting a drill bit;

a first drive train operatively connected to rotate said rotatable drill spindle;

a second drive train operatively connected to feed and retract said rotatable drill spindle to and from a drilling position with respect to said workpiece;

a first air motor to drive said first drive train and said second drive train at the first speed;

a second air motor to drive said first drive train and said second drive train at the second and slower speed;

control means connected to said first air motor and said second air motor to select between said first air motor and said second air motor;

means to activate said first air motor when said positive feed drill is started so the positive feed drill will feed to said drilling position and drill the layer of material of a first hardness at said first speed; and thrust sensing means to sense the thrust on said rotatable spindle and to cause said control means to select said second air motor to drive said first drive train and said second drive train when the thrust on said rotatable spindle increases as the hole is drilled in said material of a second hardness and to cause said control means to select said first air motor to drive said first drive train and said second drive train when the thrust decreases after the hole has been drilled in said material of a second hardness.

2. The pneumatically powered positive feed drill of claim 1 further comprising:

retract control means to sense that the rotatable drill spindle has been fed to an end-of-feed position with respect to the workpiece and to cause said rotatable drill spindle to retract from said end-of-feed position.

3. The pneumatically powered positive feed drill of claim 2 further comprising:

shut down means to sense that the rotatable drill spindle has been moved to a retract position and to cause said positive feed drill to stop rotating said rotatable drill spindle.

4. The pneumatically powered positive feed drill of claim 2 wherein said second drive train includes a differential feed gear movable between a feed position wherein said differential feed gear is rotatable with said first drive train and a retract position wherein said differential feed gear is not rotatable.

5. The pneumatically powered positive feed drill of claim 4 wherein said retract control means comprises:
a feed cylinder in said housing;
a feed piston located in said feed cylinder for reciprocal movement therein and engageable with said differential feed gear to move said differential feed gear to said feed position;
a retract cylinder in said housing;
a retract piston located in said retract cylinder for reciprocal movement therein and engageable with said differential feed gear to move said differential feed gear to said retract position; and
retract valve means for supplying air selectively to said retract cylinder and said feed cylinder.

6. The pneumatically powered positive feed drill of claim 5 wherein said retract valve means comprises:
a retract valve member for movement from a feed position wherein air is directed to said feed cylinder to a retract position wherein air is directed to said retract cylinder;
resilient means biasing said retract valve member toward said feed position; and
a lever arm pivotally mounted on said housing having one end engaging said retract valve member to hold said retract valve member in the feed position and having a second end engageable with said rotatable drill spindle when said rotatable drill spindle reaches said end-of-feed position to disengage said lever arm from said retract valve member whereupon said retract valve member shifts to said retract position and air is directed to said retract cylinder.

7. The pneumatically powered positive feed drill of claim 1 wherein said control means comprises:
a selector valve means including a valve member for movement from a first feed position wherein air is directed to said first air motor to a second feed position wherein air is directed to said second air motor;
resilient means biasing said selector valve member toward said first feed position; and
a first switch valve means connected to said selector valve means to control the flow of air to said selector valve means to move said selector valve member from said first feed position to said second feed position.

8. The pneumatically powered positive feed drill of claim 7 wherein said thrust sensing means comprises:
a seal member carried by said rotatable drill spindle and positioned between said rotatable drill spindle and said housing;
spring means positioned between said seal member and said housing biasing said seal member away from said housing to form a gap between said housing and said seal member when the thrust on the rotatable drill spindle is less than the thrust when drilling a hole in said material of the second hardness;
conduit means having a first end opening through said housing where said gap is formed and having a second end connected to said first switch valve means; and
said seal member abutting said housing and sealing said first end of said conduit means when drilling the hole in said material of said second hardness.

9. The pneumatically powered positive feed drill of claim 8 wherein said seal member and said spring means are positioned coaxially with respect to said rotatable drill spindle.

10. The pneumatically powered positive feed drill of claim 1 wherein said means to activate comprises;
a selector valve means including a valve member for movement from a first feed position wherein air is directed to said first air motor to a second feed position wherein air is directed to said second air motor;
resilient means biasing said selector valve member toward said first feed position;
a master valve means including a valve member for movement from a first feed position wherein air is directed to said selector valve means to a second feed position wherein air is exhausted from said selector valve means; and
a start valve connected between a source of pressurized air and said master valve means to control the flow of pressurized air to said master valve means.

11. The pneumatically powered positive feed drill of claim 10 wherein said feed drill further comprises a shut down means comprising:
a switch means including a valve member for
from a first position wherein air is blocked from movement being directed to said master valve means and a second position wherein air is directed to said master valve means wherein said valve member of said master valve means is moved to said second feed position; and
means carried by said rotatable drill spindle to move said valve member of said switch means to said second position when said rotatable drill spindle is moved to a retract position.

12. A method for drilling a hole in a composite material with a pneumatically powered positive feed drill, said composite material including a first portion of a first predetermined hardness overlaying a second portion of a second predetermined hardness greater than said first predetermined hardness, said positive feed drill including a drill spindle and drill bit, a first air motor connectable to the drill spindle, a second air motor connectable to the drill spindle and means to sense the thrust on the drill bit, the method comprising the steps of:
activating the first air motor to rotate the drill spindle and drill bit at a first predetermined speed and to feed the spindle and drill bit toward and into the first portion of the composite material at a first predetermined speed;
rotating and feeding the drill spindle and drill bit through the first portion of the composite material until the drill bit contacts the second portion of the composite material;
sensing the increase in thrust on the drill spindle and drill bit when the drill bit contacts the second portion of the composite material;
deactivating said first air motor;
activating the second air motor to rotate the drill spindle and drill bit at a second predetermined speed and to feed the drill spindle and drill bit into the second portion of the composite material at a second predetermined speed slower than said first predetermined speed;
sensing when the drill bit drills through the second portion of the composite material by sensing the decrease in thrust on the drill spindle and drill bit;
deactivating the second air motor;
activating the first air motor;
retracting the drill bit from the composite material to a retract position; and
deactivating the first air motor.

* * * * *

UNITED STATES PATENT AND TRADEMARK OFFICE
CERTIFICATE OF CORRECTION

PATENT NO. : 5,022,798
DATED : June 11, 1991
INVENTOR(S) : Richard E. Eckman It is certified that error appears in the above-identified patent and that said Letters Patent is hereby corrected as shown below:

```
Column 4,  line 36,   change "!02" to ---102---
Column 4,  line 42,   change "!01" to ---101---
Column 5,  line 14,   change "!42" to ---142---
Column 5,  line 15,   change "!46" to ---146---
Column 6,  line 9,    change "1!0" to ---110---
Column 6,  line 13,   change "1!6" to ---116---
Column 7,  line 25,   change "alloWs" to ---allows---
Column 10, line 21,   after "for" insert ---movement---
Column 10, line 23,   delete "movement"
```

Signed and Sealed this

Sixth Day of October, 1992

Attest:

DOUGLAS B. COMER

*Attesting Officer*     *Acting Commissioner of Patents and Trademarks*